(12) United States Patent
Ghosh et al.

(10) Patent No.: US 10,778,032 B2
(45) Date of Patent: Sep. 15, 2020

(54) SYSTEMS AND METHODS FOR IMPROVING EFFICIENCY OF A NEUTRAL-POINT-CLAMPED INVERTER

(71) Applicant: SCHNEIDER ELECTRIC IT CORPORATION, West Kingston, RI (US)

(72) Inventors: Rajesh Ghosh, Bangalore (IN); Henning Roar Nielsen, Brenderup (DK); Damir Klikic, Waltham, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 572 days.

(21) Appl. No.: 15/122,831

(22) PCT Filed: Mar. 3, 2014

(86) PCT No.: PCT/US2014/019884
§ 371 (c)(1),
(2) Date: Aug. 31, 2016

(87) PCT Pub. No.: WO2015/133985
PCT Pub. Date: Sep. 11, 2015

(65) Prior Publication Data
US 2017/0085125 A1 Mar. 23, 2017

(51) Int. Cl.
*H02M 7/04* (2006.01)
*H02J 9/06* (2006.01)
(Continued)

(52) U.S. Cl.
CPC ............ *H02J 9/062* (2013.01); *H02J 7/00* (2013.01); *H02M 1/32* (2013.01); *H02M 3/04* (2013.01);
(Continued)

(58) Field of Classification Search
USPC ................. 307/30, 66, 82; 363/60, 134
See application file for complete search history.

(56) References Cited

U.S. PATENT DOCUMENTS

| | | | | |
|---|---|---|---|---|
| 5,608,595 A | * | 3/1997 | Gourab | H03K 17/0826 361/101 |
| 2012/0320643 A1 | * | 12/2012 | Yang | H02M 1/34 363/56.01 |

(Continued)

FOREIGN PATENT DOCUMENTS

| CN | 1808832 A | 7/2006 |
|---|---|---|
| WO | 2013/187883 A1 | 12/2013 |
| WO | 2014024321 A1 | 2/2014 |

OTHER PUBLICATIONS

Brochure—Technical Information—infineon—IGBT-modules—F3L300R07PE4, Nov. 5, 2013, pp. 1-11.
(Continued)

*Primary Examiner* — Danny Nguyen
(74) *Attorney, Agent, or Firm* — Lando & Anastasi, LLP

(57) ABSTRACT

An uninterruptible power system described herein includes a first input and a second input and an AC output. The uninterruptible power system also includes power circuitry coupled to the first input, the second input, and the AC output, the power circuitry including an inverter having a first pair of switching elements including a first switching element and a second switching element and a second pair of switching elements including a third switching element and a fourth switching element, wherein the first switching element, the second switching element, the third switching element and the fourth switching element have an identical voltage rating; and a controller coupled to the second pair of switching elements and configured to control the third
(Continued)

switching element and the fourth switching element to prevent occurrence of an overvoltage condition.

18 Claims, 9 Drawing Sheets

(51) Int. Cl.
*H02M 7/487* (2007.01)
*H02M 1/32* (2007.01)
*H02J 7/00* (2006.01)
*H02M 3/04* (2006.01)

(52) U.S. Cl.
CPC ............ *H02M 7/04* (2013.01); *H02M 7/487* (2013.01); *H02J 2207/20* (2020.01); *Y10T 307/615* (2015.04); *Y10T 307/62* (2015.04)

(56) References Cited

U.S. PATENT DOCUMENTS

| | | | |
|---|---|---|---|
| 2014/0003103 A1* | 1/2014 | Aaltio | H02M 1/32 363/56.03 |
| 2014/0036555 A1 | 2/2014 | Kolhatkar et al. | |
| 2014/0119088 A1* | 5/2014 | Chen | H02M 7/487 363/134 |
| 2015/0036398 A1* | 2/2015 | Garces | H02M 7/487 363/65 |
| 2015/0214856 A1 | 7/2015 | Nakashima et al. | |

OTHER PUBLICATIONS

Wu, Bin, High-Power Converters and AC Drives—Chapter 8 "Diode Clamped Multilevel Inverters," 2006, The Institute of Electrical and Electronics Engineers, pp. 143-149.

Lee. Three-level Neutral-point-clamped Matrix Converter Topology. Thesis [online]. University of Nottingham. 2009 [retrieved May 25, 2014] Retrieved from the Internet: <URL:http:I/etheses.nottingham.ac.uk/987/>. entire document.

Notification of Transmittal of the International Search Report and the Written Opinion of the International Searching Authority from corresponding PCT/US2014/019884 dated Jun. 18, 2014.

Rodriquez et al. Multilevel Voltage-Source-Converter Topologies for Industrial Medium-Voltage Drives. IEEE Transactions on Industrial Electronics. vol. 54, No. 6. Dec. 2007. pp. 2930-2945. [retrieved May 25, 2014]. Retrieved from the Internet: <URL: http://www.researchgate.net/publication/3219670_Multilevel_ Voltage-Source-Converter_Topologies_for_Industriai_Medium-Voltage_Drives/file/9fcfd51116b31 e7efc.pdf>. entire document.

Daniela Boian et al.: "Development of Modulation Strategies for NPC Inverter Addressing DC Link Balancing and CMV Reduction", May 31, 2012 (May 31, 2012), pp. 1-173, XP055410005, Retrieved from the Internet: URL:http://projekter.aau.dk/projekter/files/63457148/Report_PED9_10_gr1041.pdf [retrieved on Sep. 26, 2017].

Extended European Search Report from corresponding European Application No. 14884437.6 dated Oct. 9, 2017.

* cited by examiner

SYSTEMS AND METHODS FOR IMPROVING EFFICIENCY OF A NEUTRAL-POINT-CLAMPED INVERTER

CROSS-REFERENCE TO RELATED APPLICATIONS

This application is a U.S. National Stage Application under 35 U.S.C. § 371 of International Application No. PCT/US2014/019884, filed Mar. 3, 2014, titled SYSTEMS AND METHODS FOR IMPROVING EFFICIENCY OF A NEUTRAL-POINT-CLAMPED INVERTER, which is hereby incorporated herein by reference in its entirety.

BACKGROUND

Technical Field

A neutral-point-clamped (NPC) three-level inverter includes one or more switching elements to operate. The methods and systems described herein ensure that the NPC operates efficiently while using low voltage rated switching elements.

Background Discussion

A Neutral-Point-Clamped (NPC) three-level inverter may be included in an uninterruptible power supply (UPS) system. In some implementations, the NPC inverter may include switching elements coupled to a DC bus. In typical UPS systems, at least some of the switching elements of an NPC inverter are implemented using power transistors having relatively high voltage ratings (e.g., 1200 volts) to prevent certain failure modes from occurring.

SUMMARY

One implementation disclosed herein is an uninterruptible power system including a first input configured to connect to a first power source, a second input configured to connect to a second power source, an AC output configured to provide output power derived from at least one of power at the first input and power at the second input, the AC output having a first output terminal and a second output terminal, power circuitry coupled to the first input, the second input, and the AC output, the power circuitry including an inverter having a first pair of switching elements including a first switching element and a second switching element, wherein the first switching element is coupled to a positive voltage rail and the second switching element is coupled to a negative voltage rail and a second pair of switching elements including a third switching element and a fourth switching element, wherein the third switching element is coupled to the first switching element and the fourth switching element is coupled to the second switching element, the third switching element and the fourth switching element also being coupled to the first output terminal, wherein the first switching element, the second switching element, the third switching element and the fourth switching element have an identical voltage rating, and a controller coupled to the second pair of switching elements and configured to control the third switching element and the fourth switching element to prevent occurrence of an overvoltage condition.

In one implementation, the second power source includes a battery. In another implementation, the controller may be configured to provide a plurality of pulse width modulated control signals to the inverter. The plurality of pulse width modulated control signals provided by the controller may be configured to prevent occurrence of a plurality of overvoltage conditions.

In some implementations, the plurality of overvoltage conditions may include at least one of the following: the first switching element is on while the third switching element is off, the second switching element is turned on while the fourth switching element is off, the first and the third switching elements or the second and the fourth switching elements simultaneously change their states, an incorrect voltage across the third or the fourth switching elements, a junction capacitance of the third switching element is less than the first switching element, or a junction capacitance of the fourth switching element is less than the second switching element.

In some implementations, the controller may include an overcurrent protection module. The inverter may include an undervoltage-lockout protection circuit coupled to the second pair of switching elements. The undervoltage-lockout protection circuit may include an isolated power supply, a gate driver chip with undervoltage-lockout protection, a gate drive undervoltage monitoring unit and an optocoupler. The controller may be coupled to the undervoltage-lockout protection circuit to receive at least one monitoring signal.

In another implementation, the inverter may include a first resistor and a first diode connected between the first pair of switching elements, wherein the first resistor and the first diode are further connected to a second resistor and a second diode, wherein the second resistor and the second diode are connected between the second pair of switching elements. In some implementations, the connection of the first resistor and the first diode between the first pair of switching elements and to the second resistor and the second diode, wherein the second resistor and the second diode are connected between the second pair of switching elements may protect the second pair of switching elements against a varying junction capacitance by equalizing voltage distribution among the second pair of switching elements.

In another implementation, the connection of the first resistor and the first diode between the first pair of switching elements and to the second resistor and the second diode, wherein the second resistor and the second diode are connected between the second pair of switching elements may protect against an incorrect voltage across the third or the fourth switching elements, a junction capacitance of the third switching element being less than the first switching element, or a junction capacitance of the fourth switching element being less than the second switching element.

In yet another implementation, each switching element of the second pair of switching elements may include an insulated gate bipolar transistor.

Another implementation described here is an uninterruptible power supply system including a first input configured to connect to a first power source, a second input configured to connect to a second power source, an AC output configured to provide output power derived from at least one of power at the first input and power at the second input, the AC output having a first output terminal and a second output terminal, and power circuitry coupled to the first input, the second input, and the AC output, the power circuitry including an inverter having a first pair of switching elements including a first switching element and a second switching element, wherein the first switching element is coupled to a positive voltage rail and the second switching element is coupled to a negative voltage rail and a second pair of switching elements including a third switching element and a fourth switching element, wherein the third switching element is coupled to the first switching element and the fourth switching element is coupled to the second switching element, the third switching element and the fourth switching element also being coupled to the first output terminal, wherein the first switching element, the second switching element, the third switching element and the fourth switching element have an identical voltage rating, and means coupled to the second pair of switching elements and configured to control the third switching element and the fourth switching element to prevent occurrence of a plurality of overvoltage conditions.

In one implementation, the second power source may include a battery.

In yet another implementation, the plurality of overvoltage conditions may include at least one of the following: the first switching element is on while the third switching element is off, the second switching element is turned on while the fourth switching element is off, the first and the third switching elements or the second and the fourth switching elements simultaneously change their states, an incorrect voltage across the third or the fourth switching elements, a junction capacitance of the third switching element is less than the first switching element, or a junction capacitance of the fourth switching element is less than the second switching element.

In another implementation, the inverter may include an undervoltage-lockout protection circuit coupled to the second pair of switching elements.

In yet another implementation, a method of maintaining voltage is provided. The computer-implemented method includes providing, from a controller, a control signal to power circuitry including an inverter, wherein the inverter includes a first pair of switching elements including a first switching element and a second switching element, wherein the first switching element is coupled to a positive voltage rail and the second switching element is coupled to a negative voltage rail and a second pair of switching elements including a third switching element and a fourth switching element, wherein the third switching element is coupled to the first switching element and the fourth switching element is coupled to the second switching element, the third switching element and the fourth switching element also being coupled to the first output terminal, wherein the first switching element, the second switching element, the third switching element and the fourth switching element have an identical voltage rating, wherein the control signal powers on or off the second pair of switching elements, receiving, at the controller, a signal indicating a voltage at an output terminal of an AC output coupled to the power circuitry; and maintaining the voltage of the second pair of switching elements to prevent occurrence of an overvoltage condition.

In one implementation, the inverter may include an undervoltage-lockout protection circuit coupled to the second pair of switching elements. In another implementation, the inverter may include a first resistor and a first diode connected between the first pair of switching elements, wherein the first resistor and the first diode are further connected to a second resistor and a second diode, wherein the second resistor and the second diode are connected between the second pair of switching elements.

Another implementation described herein is a method of generating an AC voltage from a DC voltage using a first pair of switching elements including a first switching element and a second switching element, wherein the first switching element is coupled to a positive voltage rail and the second switching element is coupled to a negative voltage rail and a second pair of switching elements including a third switching element and a fourth switching element, wherein the third switching element is coupled to the first switching element and the fourth switching element is coupled to the second switching element, the third switching element and the fourth switching element also being coupled to an output terminal, wherein the first switching element, the second switching element, the third switching element and the fourth switching element have an identical voltage rating. The method may include generating by a controller, control signals for controlling switching of the first and second pair of switching elements, receiving, at the controller, an AC voltage signal indicating a magnitude of the AC voltage, and, based on the AC voltage signal, modifying the control signals to prevent an overvoltage condition of the AC voltage.

In one implementation, the method includes receiving, at the controller, a signal indicating undervoltage lockout status and modifying the control signals based on the signal indicating undervoltage lockout status.

In another implementation, the method includes using a resistor configuration to prevent unequal junction capacitance or incorrect switch transitions between the first pair of switching elements and the second pair of switching elements, the resistor configuration comprising a first resistor and a first diode connected between the first pair of switching elements, wherein the first resistor and the first diode are further connected to a second resistor and a second diode, wherein the second resistor and the second diode are connected between the second pair of switching elements.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "another embodiment," "some embodiments," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one implementation are discussed below with reference to the accompanying figures, which are no t intended to be drawn to scale. The figures are included to provide an illustration and a further understanding of the various aspects and implementations, and are incorporated in and constitute a part of this specification, but are not intended as a definition of the limits of any particular implementation. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Figure 1:
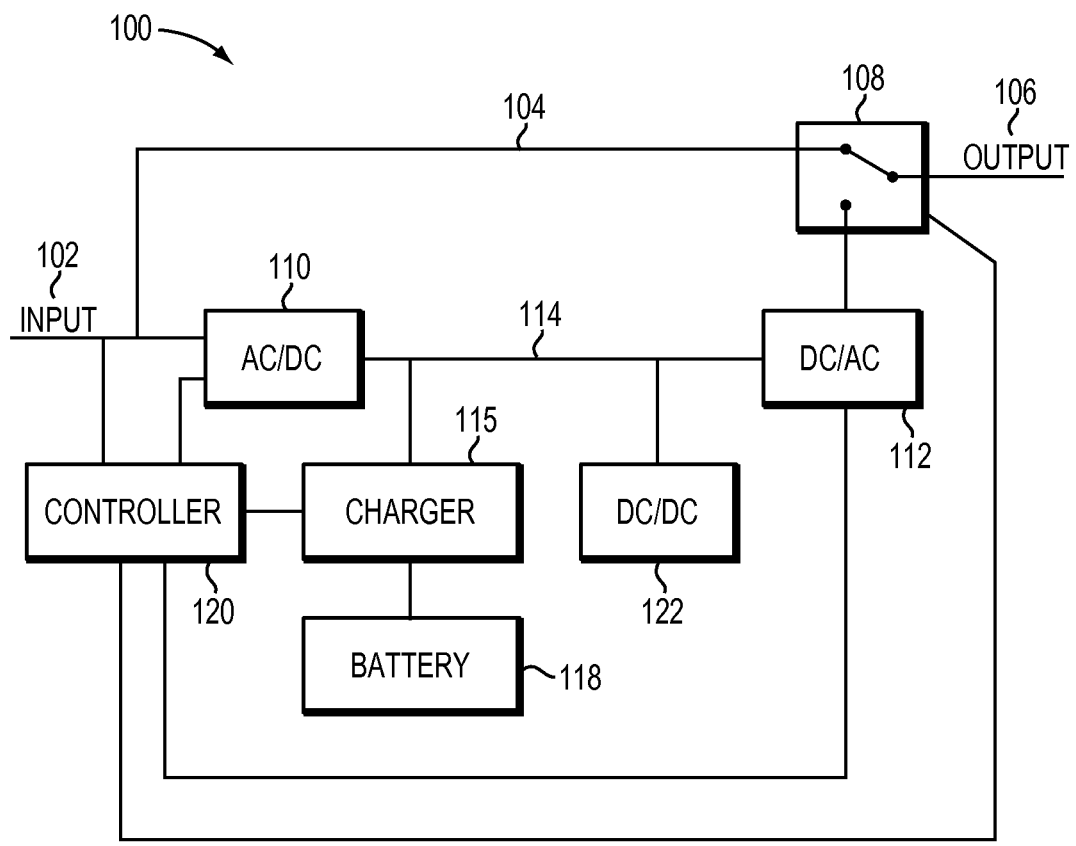
FIG. 1 is a block diagram of an uninterruptible power supply (UPS) system, according to one implementation.

FIG. 1 illustrates a UPS 100 according to aspects of the current disclosure. The UPS 100 includes an input 102, an output 106, a bypass line 104, an AC/DC converter 110, a DC bus 114, a DC/AC inverter 112, a battery charger 116, a battery 118, a DC/DC converter 122, and a controller 120. The input 102 is configured to be coupled to an AC power source such as a utility power source and to the AC/DC converter 110. The input 102 is also selectively coupled to the output 106 via the bypass line 104 and the switch 108.

The AC/DC converter 110 is also coupled to the DC/AC inverter 112 via the DC bus 114. The DC/AC inverter 112 is also selectively coupled to the output 106 via the switch 108. The battery 118 is coupled to the DC bus 114 via the battery charger 116 and also to the DC bus 114 via the DC/DC converter 122. The controller 120 is coupled to the input 102, the switch 108, the battery charger 116, the AC/DC converter 110, and the DC/AC inverter 112. In other embodiments, the battery 118 and the charger 116 may be coupled to the AC/DC converter 110.

Based on the quality of the AC power received from the utility source, the UPS 100 is configured to operate in different modes of operation. For example, according to one embodiment, the controller 120 monitors the AC power received from the utility source at the input 102 and, based on the monitored AC power, sends control signals to the switch 108, the battery charger 116, the AC/DC converter 110, and the DC/AC inverter 112 to control operation of the UPS 100.

The controller 120 may be a digital controller, e.g., digital signal processor, complex programmable logic controller, microcontroller, or other appropriate digital platform. In another implementation, the controller 120 may be an analog controller, such as a hysteresis current controller. In yet another implementation, the controller 120 may be a combination of a digital and analog controller.

The UPS 100 may be configured to operate in several modes of operation. For example, the UPS 100 may have modes of operation including bypass, online, or battery. In both battery and online modes, the DC/AC inverter 112 may be used by the UPS 100 to measure output current at the output 406 to determine an output load current. The controller 120 may use the output load current during operation of the DC/AC inverter 112. For example, an output current may be determined for the output 106 based on a voltage measurement as described below. In at least one embodiment, the output load current may be used by the controller 120 to regulate the output of the inverter.

Figure 2:
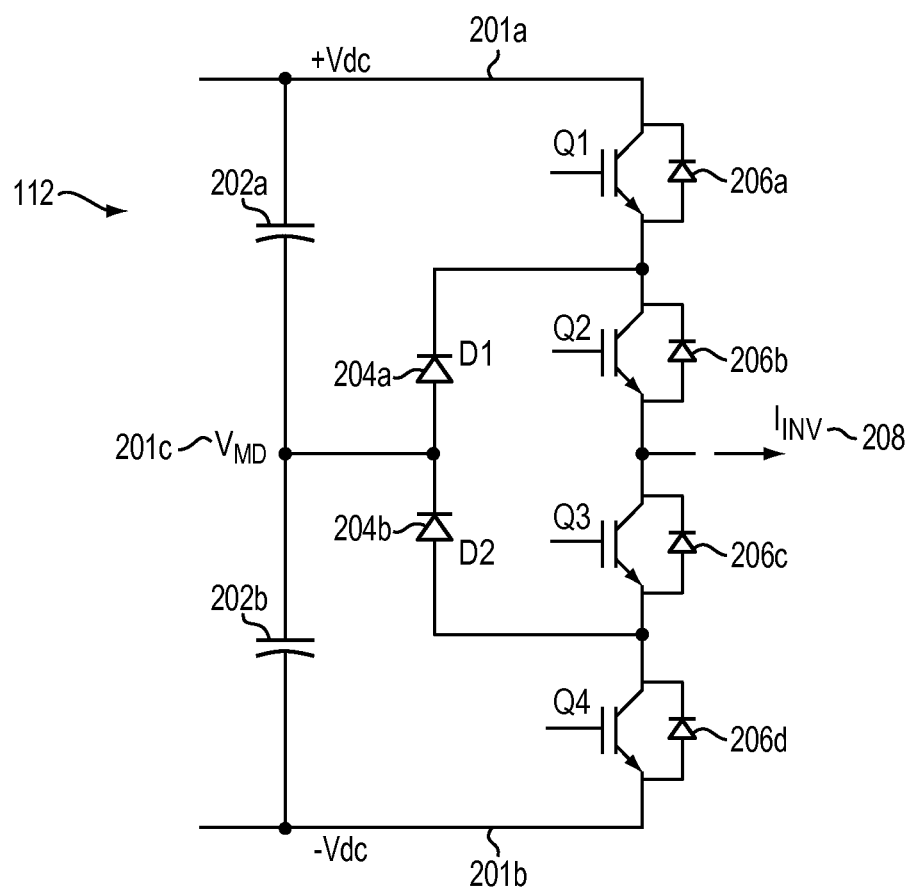
FIG. 2 is a schematic circuit diagram of an inverter of the UPS system of FIG. 1.

FIG. 2 is a schematic circuit diagram showing the inverter 112 of the UPS 100 in greater detail, according to one implementation. The inverter 112 includes a voltage input 201a, another voltage input 201b with respect to the midpoint 201c, capacitors 202a and 202b, and diodes 204a and 204b, switching elements 206a-206d. As shown in FIG. 2, switching elements may be implemented as IGBTs 206a-

206d. The NPC inverter 112 may be used in the UPS system 100 and other power conversion systems, such as motor drives, active filters, etc.

The inverter 112 may include one or more switching elements 206a-206d. The switching elements 206a-206d may include semiconductor devices, such as IGBTs, MOSFETS, or other appropriate devices. As shown in FIG. 2, a first pair of switching elements includes a first switching element 206a and a second switching element 206d (Q1 and Q4). The first switching element 206a (Q1) is coupled to a positive voltage rail 201a and the second switching element 206d (Q4) is coupled to a negative voltage rail 201b.

FIG. 2 also illustrates a second pair of switching elements that includes a third switching element 206b and a fourth switching element 206c (Q2 and Q3). The third switching element 206b (Q2) is coupled to the first switching element 206a (Q1) and the fourth switching element 206c (Q3) is coupled to the second switching element 206d (Q4). The third and the fourth switching elements 206b-c may be coupled to the AC output.

In one embodiment, the one or more switching elements 206a-206d have an identical voltage rating. In one implementation of FIG. 2, the one or more switching elements 206a-206d may each have a 600 voltage rating. The diodes 204a and 204b may also have an identical voltage rating to the one or more switching elements 206a-206d, while the UPS system 100 has a +/−400 Volt DC bus. The diodes 204a and 204b may include freewheeling diodes to prevent sudden voltage spikes. The one or more switching elements 206a-d may be clamped through diodes 204a and 204b to a DC bus voltage, so that the voltage never exceeds the DC bus voltage (e.g., 400 Volts.)

The one or more switching elements 206a-206d with a 600 voltage or lower rating may have lower conduction losses than a switching element with a higher voltage rating. In addition, the complexity and the cost of the inverter 112 is at a minimum.

The inverter 112 may also include one or more high-valued resistors that may be connected across the diodes 204a and 204b shown in FIG. 2. The resistors may protect switching elements 206a-206d against overvoltage (e.g., greater than 600 Volts) when there is an unequal junction capacitance, a transition to state (0000) with an initial voltage (e.g., 400 Volts) across one of the switching elements 206a-206d, or during other appropriate conditions.

Figure 3:
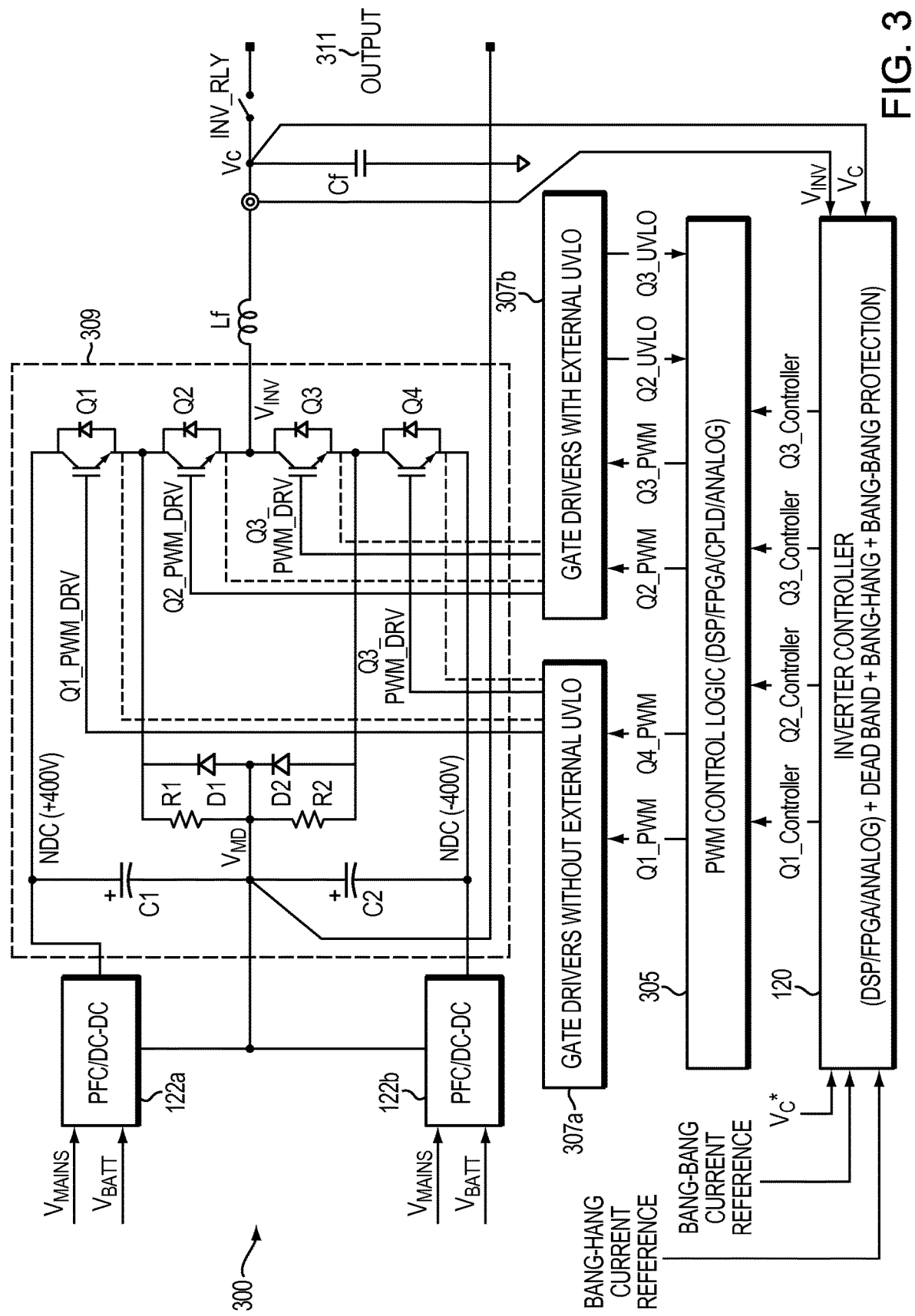
FIG. 3 is a general schematic diagram of an overvoltage protection scheme for a pair of middle switching elements of the inverter of FIG. 2, according to one implementation.

FIG. 3 is a general schematic 300 of an overvoltage protection for a pair of middle switching elements of the inverter, according to one implementation. Schematic 300 may include DC/DC converter inputs 122a, 122b, inverter controller 120, PWM control logic 305, gate driver without external UVLO 307a, gate driver with external UVLO 307b, inverter 112 and output 311.

The inputs 122a, 122b may include voltage from the battery or from a main power source. In some implementations, the inverter controller 120 may include a deadband generator. In some implementations, the inverter controller 120 may include a bang-bang and/or bang-hang overcurrent protection module. The inverter controller 120 provides four PWM (pulse width modulated) pulses (signals) Q1_Controller, Q2_Controller, Q3_Controller and Q4_Controller for the inverter devices Q1, Q2, Q3 and Q4, respectively.

The inverter controller 120 may be coupled to the second pair of switching elements (Q2 and Q3) and configured to control the third switching element (Q2) and the fourth switching element (Q3) to prevent occurrence of a plurality of overvoltage conditions.

The output signals (pulses) of the inverter controller 120 are processed through the PWM control logic 305 before they are applied to the gate drivers 307a, 307b. The PWM control logic 305 receives two inputs, Q2_UVLO and Q3_UVLO (gate driver Under Voltage Lock Out status) from the output of the Q2 and Q3 gate drivers, as shown in FIG. 3. The PWM control logic 305 protects the inverter 112 second pair of switching elements, Q2 and Q3, against overvoltage (>600V) in the occasions of (a) wrong PWM input pulses and its switching sequence, (b) mid-device gate driver UVLO and (c) gate driver propagation delay mismatch, which is described in further detail herein.

The gate driver chips 307a and 307b may include four isolated gate drivers used to drive the four inverter switching elements, Q1, Q2, Q3 and Q4. The gate drivers 307a, 307b receive inputs from the output of the PWM control logic 305. Gate driver 307a may be used for Q1 and Q4, the first pair of switching elements. Gate driver 307b with additional (external) UVLO protection may be used for the mid switching elements, Q2 and Q3. The UVLO status of these two gate drivers 307a, 307b may be provided to the PWM control logic 305 via a digital isolator.

The inverter 112 may be a three-level NPC inverter that includes a number of hardware components. FIG. 3 includes switching elements, Q1 and Q4 along with diodes D1 and D2, which may all have an identical voltage rating, such as 600 Volts. R1 and R2 may be high valued resistors and connected across D1 and D2. As shown in FIG. 3, resistors R1 and R2 may protect Q2 and Q3 from a voltage greater than 600 Volts during conditions of unequal junction capacitances and switching transition to state (0000) with initial voltage of 400 Volts across Q2 or Q3 (as further described in FIGS. 4A, 4B, and 5), by equalizing the voltage distribution among Q1 and Q2. In another implementation, the resistors may be connected across Q2 and Q3.

Figure 4A:
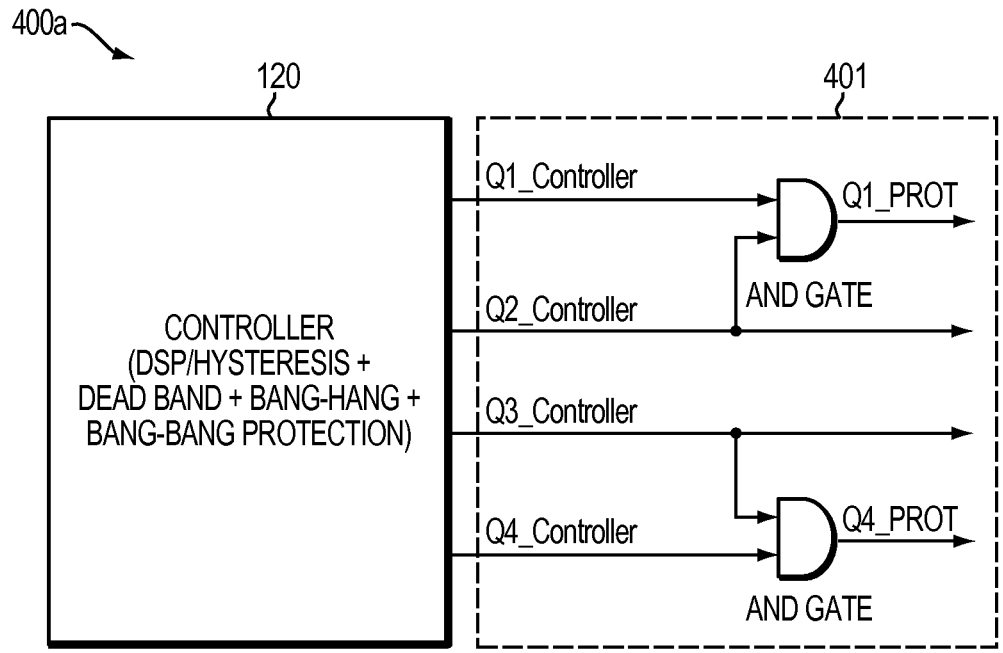
FIG. 4A is an illustration of a processing circuit to prevent incorrect gate signals, according to one implementation.

FIG. 4A is an illustration of a processing circuit 400a to prevent incorrect PWM input pulses, according to one implementation. For example, as shown in FIG. 4, the states of 1000, 0001 and 1001 would be incorrect PWM pulses. Processing circuit 400a includes controller 120 and logic 401.

The processing circuit 400a, i.e., protection module, ensures that the inverter 112 is protected from an overvoltage condition. For example, the processing circuit 400a ensures that one of the first pair of switching elements, Q1 or Q4 turns on only if the PWM input for one of the second pair of switching elements, Q2 or Q3, is high. As shown in FIG. 4A, the Q1 and Q2 pulses are passed through an AND gate to generate the gate pulse for Q1, and the Q3 and Q4 pulses are passed through another AND gate to generate the gate pulse for Q4. Logic 401 ensures interlocking at the gate driver input.

Figure 4B:
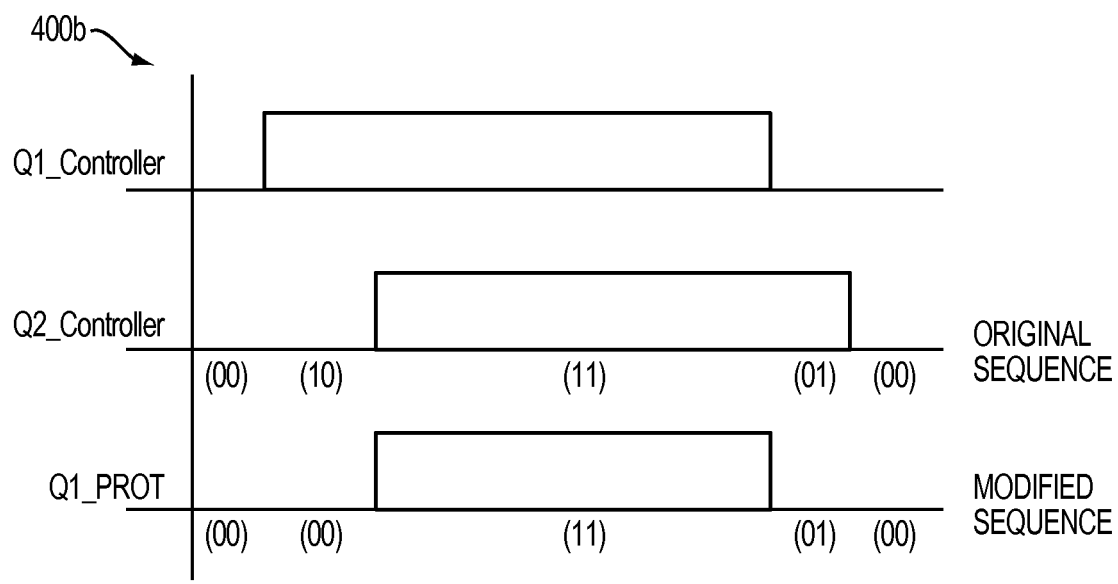
FIG. 4B is an illustration of a timing diagram to prevent incorrect gate signals, according to one implementation.

FIG. 4B is an illustration of a timing diagram 400b to prevent incorrect PWM input pulses, according to one implementation. As shown in FIG. 4B, the pulse to Q1 and the pulse to Q2 is shown. By ANDing Q1 with Q2, the signal Q1_Prot (gating pulse) has a modified sequence, which prevents an incorrect PWM input pulse 1000 or 0001 or 1001 from being applied to the inverter devices Q1, Q2, Q3, Q4.

Figures 5A, 5B:
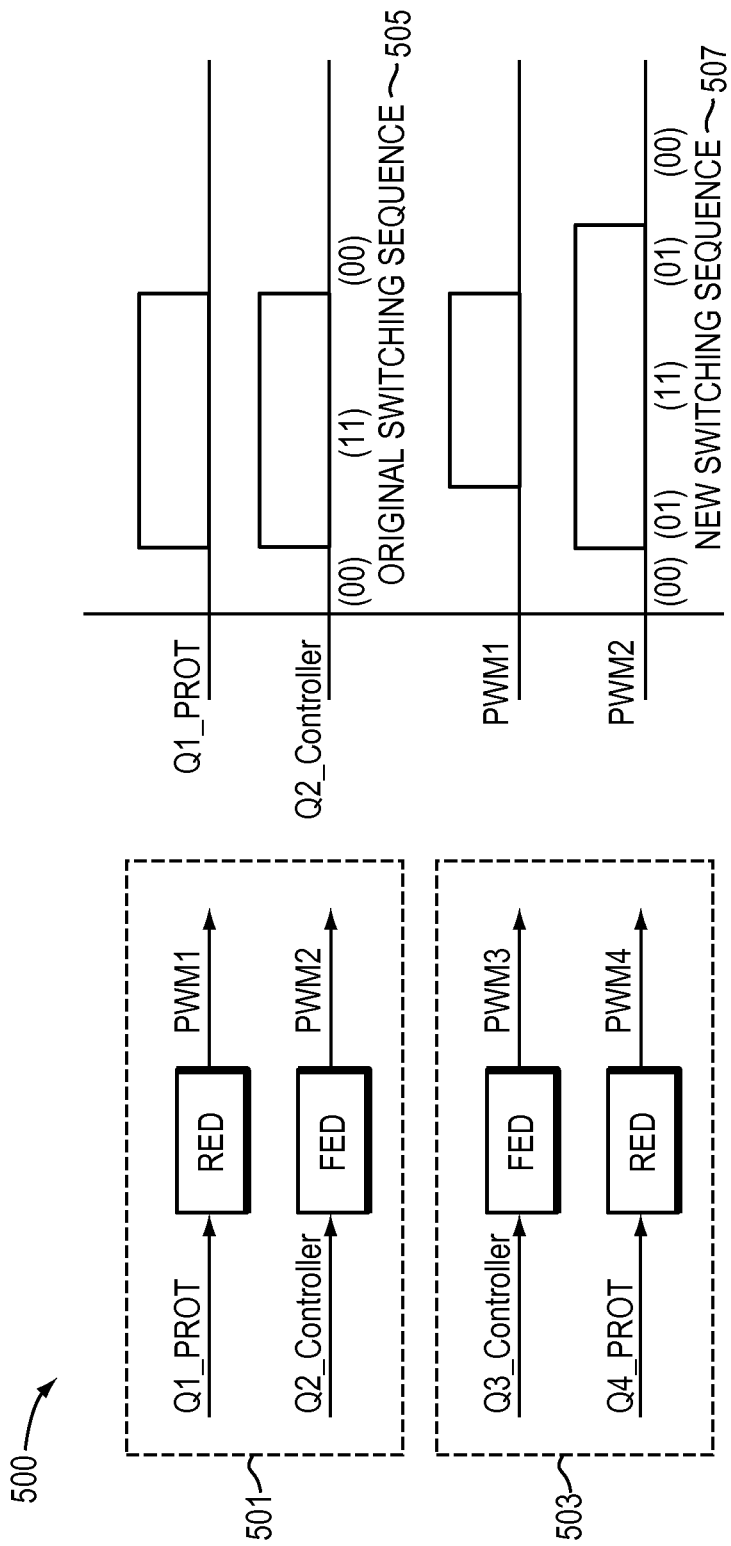
FIG. 5A is a functional block diagram of a scheme used to prevent incorrect pulse width modulated (PWM) sequences, according to one implementation.
FIG. 5B provides a timing diagram of the signals, according to one implementation.

FIG. 5A is a functional block diagram 500 including blocks 501, 503 of a scheme used to prevent incorrect pulse width modulated (PWM) sequences, according to one implementation. FIG. 5B provides a timing diagram of the signals of block 501. The following PWM input sequences may be considered incorrect sequences, (1100) to (0000), (0000) to (1100), (0011) to (0000) or (0000) to (0011).

The gating pulses for Q1 and Q4 (Q1_Prot and Q4_Prot) are delayed at the rising edges (RED), while Q2 and Q3 pulses are delayed at the falling edges (FED). The rising and falling edge delays (RED and FED) protect against different gate driver propagation delays. The switching sequences 505, 507 are an example of block 501. The switching sequence 505 is the original switching sequence of gating pulses Q1 and Q2, which utilizes the state of 0000. As shown in the modified timing diagram 507, the incorrect sequences (1100) to (0000), (0000) to (1100), (0011) to (0000) or (0000) to (0011) no longer occur.

The scheme 500 depicted in FIG. 5A, may also ensure that the middle switching element Q2 (or Q3) is already on before the outer switching element Q1 (or Q4) actually turns on. A correct PWM signal (1100) at the gate driver input can lead to a wrong PWM signal (1000) at the gate driver output for short duration due to unequal propagation delays of the gate drivers. The Q1 pulses may be delayed at the rising edges and the Q2 pulses delayed at the falling edges. The necessary delays may be incorporated in a similar fashion, as shown in FIG. 4.

Figure 6:
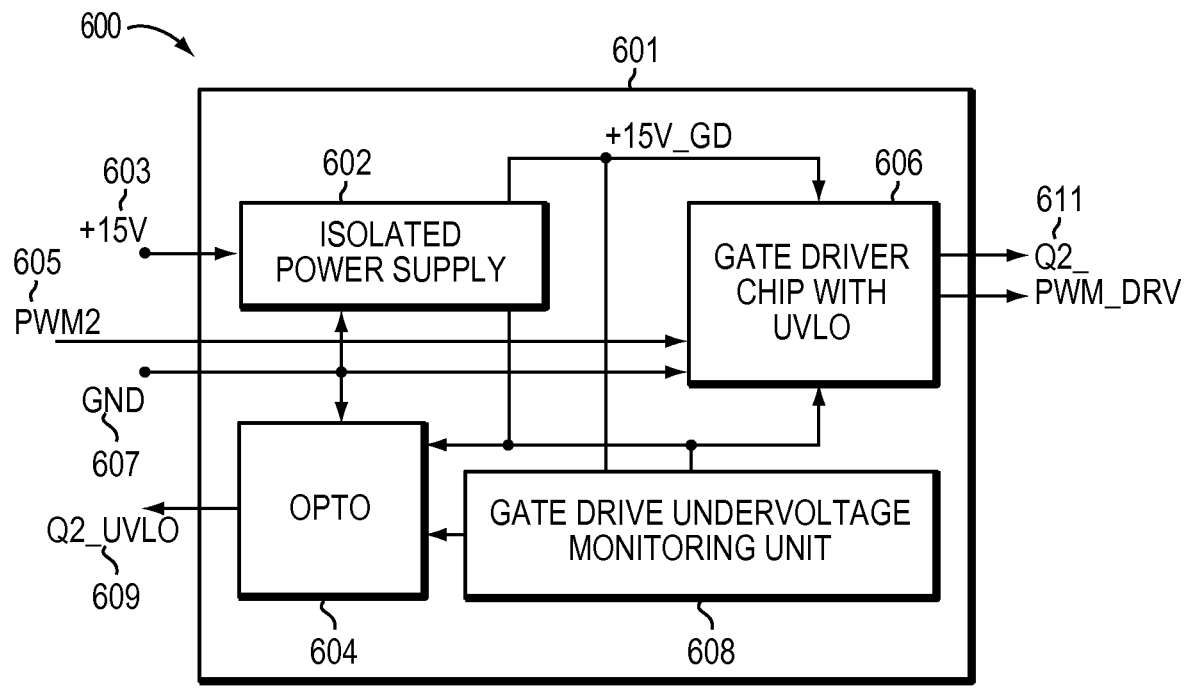
FIG. 6 is an example of a gate driver for a pair of middle switching elements of the inverter of FIG. 2, according to one implementation.

FIG. 6 is function block diagram 600 of a gate driver 601 for the second pair of switching elements (Q2 and Q3 in previous figures) of the inverter, according to one implementation. The gate driver 601 may include an isolated power supply 602 (with input voltage 603), an optocoupler 604 (with UVLO signal output 609), a gate driver chip with UVLO 606 (with input PWM 605 and a ground 607), and a gate driver external undervoltage monitoring unit 608. The gate driver 601 for Q2 and Q3 prevents the inverter from turning on with incorrect PWM input (1000), (0001) and (1001) and wrong switching sequences due to its internal UVLO protection. These incorrect PWM inputs might appear at the gate drivers output 611 even if the controller outputs correct PWM pulses.

Although, each gate driver 307*a* and 307*b*, as shown in FIG. 3 has an internal UVLO protection 606, an under voltage (UV) monitoring circuit (external UV protection) 608 may be included to monitor the gate drive bias power supply voltage +15V_GD of gate driver chip 606.

In another implementation, the gate driver 601 may be implemented in all of the switching elements (e.g., Q1-Q4). All of the UVLO output signals (609) of the gate drivers can be ANDed together into a single UVLO signal.

During UVLO shutdown, the first pair of switching elements (Q1, Q4) may power down before the second pair of switching elements (Q2, Q3) to provide protection against incorrect PWM input. Similarly, during UVLO reset, the second pair of switching elements should power on before the first pair of switching elements. This is taken care by masking (ANDing) the PWM inputs Q1_Prot, Q2_Controller, Q3_Controller and Q4_prot with the UVLO input, and passing the masked pulses through the rising and falling edges.

Figure 7:
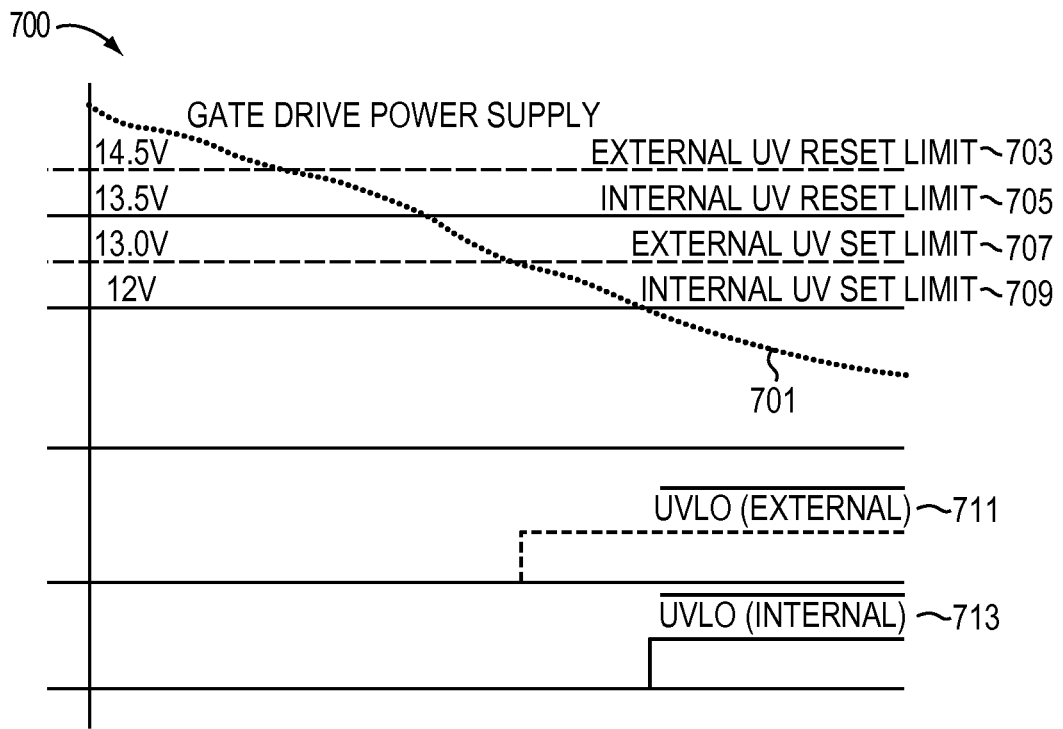
FIG. 7 is a chart of different limits for the gate driver under voltage protection according to one implementation.

FIG. 7 is a chart 700 of different limits for the gate driver under voltage protection, according to one implementation. The external UVLO limit 711 is set little above the gate driver internal UVLO limit 713 as shown in FIG. 7. If the gate driver power supply voltage decreases from its normal level (701), the undervoltage (UV) will be detected first by the external UV protection circuit 608. Upon detection, the external UV protection circuit 608 sends this information through an OPTO coupler 604 to the PWM control logic, which shuts down all the PWM pulses.

In another implementation, the UVLO information may be modified to have a latched shutdown of the inverter. An additional capacitor may be connected across the secondary side gate driver power supply 602 of the second pair of switching elements (Q2 and Q3) to delay the voltage fall from external UVLO set limit 703, 707 to internal UVLO set limit 705, 709. This may ensure that all of the switching elements will be turned off safely before only one of the middle switching elements (Q2 or Q3) gets turned off by its own gate driver's internal UVLO protection.

Figure 8:
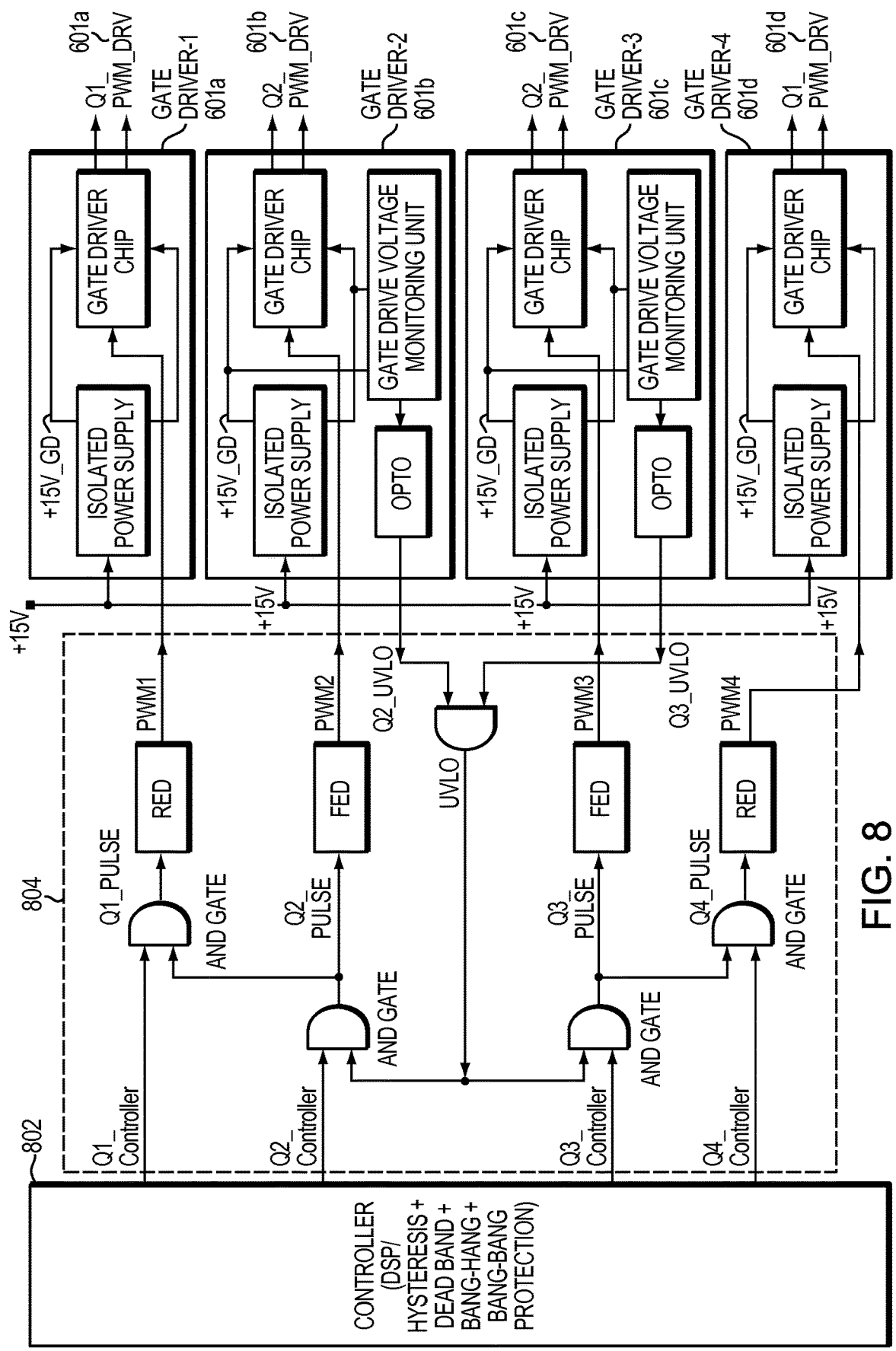
FIG. 8 is an illustration of hardware for pulse-width modulated (PWM) control logic, according to one implementation.

FIG. 8 is a functional block diagram 800 showing the operation of pulse-width modulated (PWM) control logic, according to one implementation. The functional block diagram 800 shown in FIG. 8 is a combination of the protection schemes illustrated in FIGS. 4A, 5 (illustrated as block 804) and 6 (illustrated as blocks 601*a*-601*d*). In some implementations, the PWM control logic may be implemented in the digital domain and/or be implemented in software operating one or more processors of the UPS 100.

Figure 9:
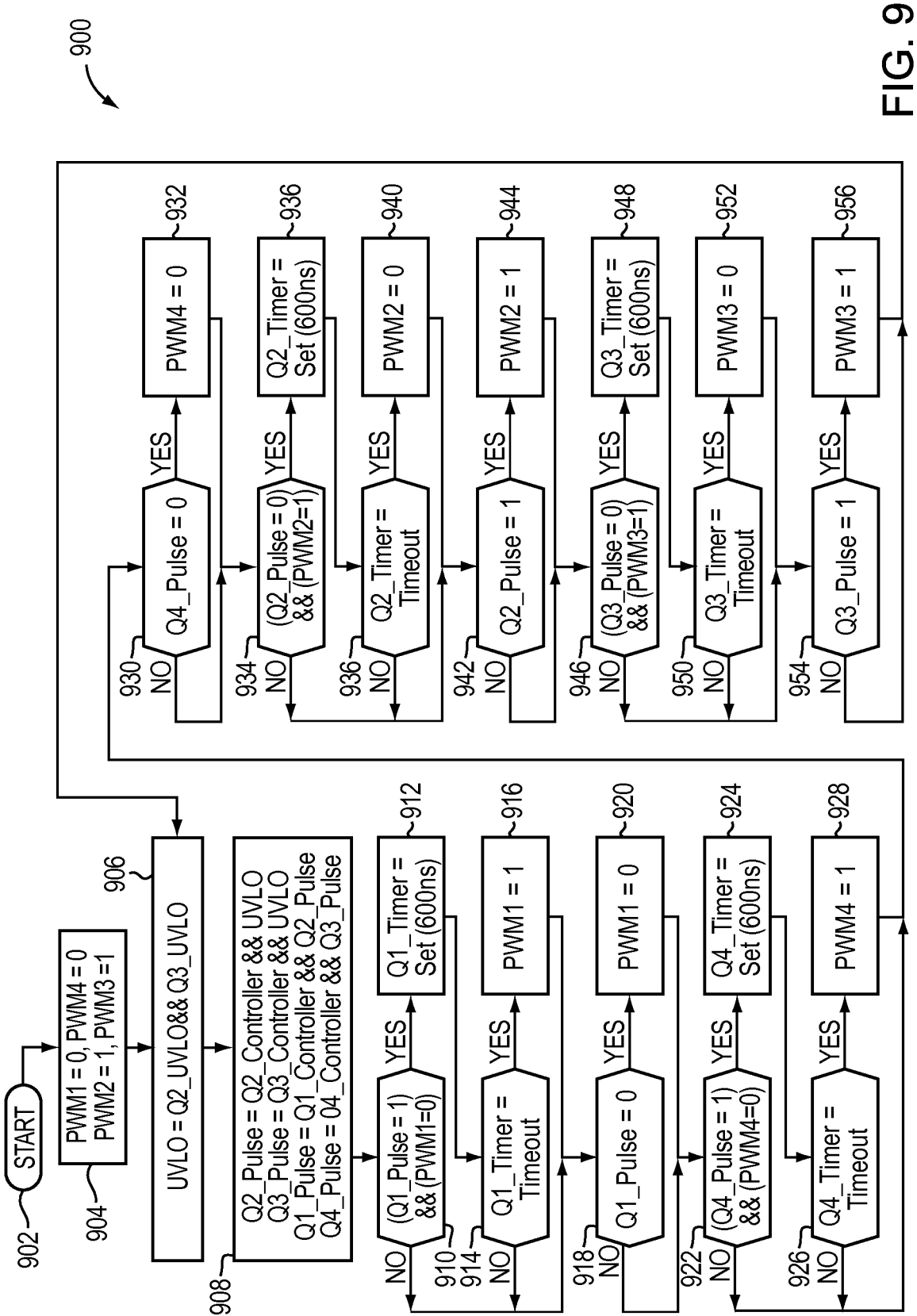
FIG. 9 is a diagram of a flowchart of pulse-width modulated (PWM) control logic, according to one implementation.

FIG. 9 shows a diagram of a flowchart 900 of pulse-width modulated (PWM) control logic 305, according to one implementation. Flowchart 900 begins at 902. At 904, the first pair of switching elements (Q1 and Q4) PWM signals are set to 0 and the second pair of switching elements (Q2 and Q3) PWM signals are set to 1.

At 906, the second pair of switching elements (Q2 and Q3) have their respective UVLO signals ANDed to form a UVLO signal. At 908, Q2_controller is ANDed with UVLO to create Q2_Pulse, Q3_controller is ANDed with UVLO to create Q3_Pulse, Q1_controller is ANDed with Q2_Pulse to create Q1_pulse, and Q4_controller is ANDed with Q3_Pulse to create Q4_pulse.

For each switching element Q1-Q4, steps 910-920 are representative of the steps for each switching element.

At 910, a determination is made, based on ANDing Q1_Pulse=1 and PWM1=0, whether the result is the correct output. Based on an affirmative determination, at 912, the Q1_Timer is set. In this example, the Q1_Timer is set to 600 ns.

At 914, a determination is made whether Q1_Timer=Timeout. Based on an affirmative determination, at 916, PWM1 is equal to 1. At 918, a determination is made whether Q1 Pulse is set to 0. Based on an affirmative determination, PWM 1 is set to 0. Steps 922-932 describe the second switching element (Q4), steps 934-944 describe the third switching element (Q2), and steps 946-956 describe the fourth switching element (Q3).

Figure 10:
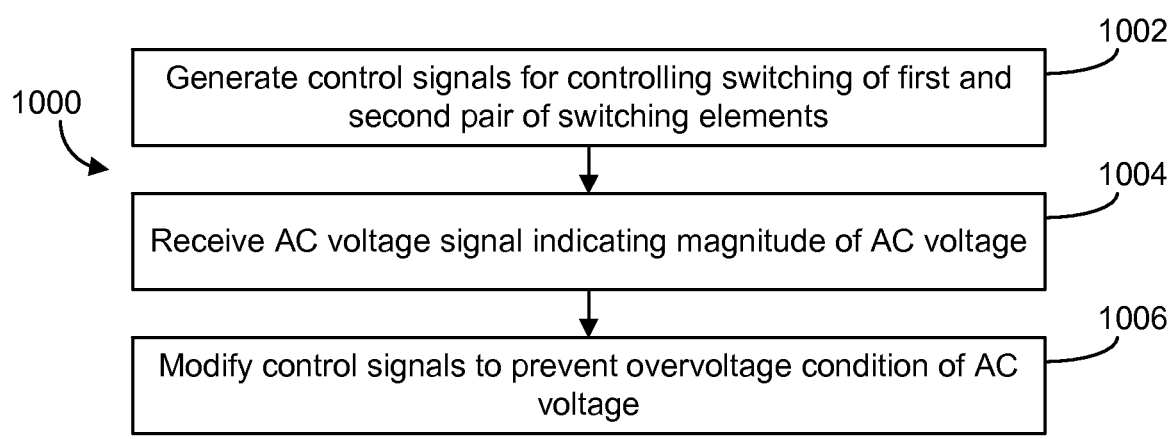
FIG. 10 is a block diagram of a method for generating an AC voltage from a DC voltage, according to one implementation.

FIG. 10 is a block diagram of a method for generating an AC voltage from a DC voltage, according to one implementation. The method 1000 may implement the systems described herein. In a general overview, control signals may be generated, by a controller, for controlling switching of the first and the second pair of switching elements (block 1002). An AC voltage signal may be received at the controller, which indicates a magnitude of the AC voltage (block 1004). Based on the AC voltage signal, the control signals may be modified to prevent an overvoltage condition of the AC voltage (block 1006).

In some implementations, the method 1000 may further include receiving, at the controller, a signal indicating undervoltage lockout status and modifying the control signals based on the signal indicating undervoltage lockout status.

In another implementation, the method 1000 may include using a resistor configuration to prevent unequal junction capacitance or incorrect switch transitions between the first pair of switching elements and the second pair of switching elements, the resistor configuration comprising a first resistor and a first diode connected between the first pair of switching elements, wherein the first resistor and the first diode are further connected to a second resistor and a second diode, wherein the second resistor and the second diode are connected between the second pair of switching elements.

Embodiments above have been described with regard to an improved inverter used in an online UPS. In other embodiments, inverters described herein may be used in other types of UPS's and in other types of power devices as well.

Various aspects and functions described herein in accord with the present disclosure may be implemented as hardware, software, firmware or any combination thereof. Aspects in accord with the present disclosure may be implemented within methods, acts, systems, system elements and components using a variety of hardware, software or firmware configurations. Furthermore, aspects in accord with the present disclosure may be implemented as specially-programmed hardware and/or software.

Having thus described several aspects of at least one example, it is to be appreciated that various alterations, modifications, and improvements will readily occur to those skilled in the art. Such alterations, modifications, and improvements are intended to be part of this disclosure, and are intended to be within the scope of the examples discussed herein. Accordingly, the foregoing description and drawings are by way of example only.

What is claimed is:

1. An uninterruptible power system comprising:
   a first input configured to connect to a first power source;
   a second input configured to connect to a second power source;
   an AC output configured to provide output power derived from at least one of power at the first input and power at the second input, the AC output having a first output terminal and a second output terminal;
   power circuitry coupled to the first input, the second input, and the AC output, the power circuitry including an inverter having a first pair of switching elements including a first switching element and a second switching element, wherein the first switching element is coupled to a positive voltage rail and the second switching element is coupled to a negative voltage rail and a second pair of switching elements including a third switching element and a fourth switching element, wherein the third switching element is coupled to the first switching element and the fourth switching element is coupled to the second switching element, the third switching element and the fourth switching element also being coupled to the first output terminal, wherein the first switching element, the second switching element, the third switching element and the fourth switching element have an identical voltage rating; and
   a controller coupled to the second pair of switching elements and configured to control the third switching element and the fourth switching element to prevent occurrence of an overvoltage condition, wherein:
      the inverter comprises a first resistor and a first diode connected between the first pair of switching elements,
      the first resistor and the first diode are further connected to a second resistor and a second diode, and
      the second resistor and the second diode are connected between the second pair of switching elements.

2. The system of claim 1, wherein the system includes the second power source and the second power source includes a battery.

3. The system of claim 1, wherein the controller is configured to provide a plurality of pulse width modulated control signals to the inverter, and wherein the plurality of pulse width modulated control signals provided by the controller is configured to prevent occurrence of a plurality of overvoltage conditions, and wherein the plurality of overvoltage conditions includes at least one of the following: the first switching element is on while the third switching element is off, the second switching element is on while the fourth switching element is off, the first and the third switching elements or the second and the fourth switching elements simultaneously change their states, an incorrect voltage across the third or the fourth switching elements, a junction capacitance of the third switching element is less than a junction capacitance of the first switching element, or a junction capacitance of the fourth switching element is less than a junction capacitance of the second switching element.

4. The system of claim 1, wherein the inverter includes an undervoltage-lockout protection circuit coupled to the second pair of switching elements.

5. The system of claim 1, wherein the connection of the first resistor and the first diode between the first pair of switching elements and to the second resistor and the second diode, wherein the second resistor and the second diode are connected between the second pair of switching elements protects the second pair of switching elements against a varying junction capacitance by equalizing voltage distribution among the second pair of switching elements.

6. An uninterruptible power supply system comprising:
   a first input configured to connect to a first power source;
   a second input configured to connect to a second power source;
   an AC output configured to provide output power derived from at least one of power at the first input and power at the second input, the AC output having a first output terminal and a second output terminal; and
   power circuitry coupled to the first input, the second input, and the AC output, the power circuitry including an inverter having a first pair of switching elements including a first switching element and a second switching element, wherein the first switching element is coupled to a positive voltage rail and the second switching element is coupled to a negative voltage rail and a second pair of switching elements including a third switching element and a fourth switching element, wherein the third switching element is coupled to the first switching element and the fourth switching element is coupled to the second switching element, the third switching element and the fourth switching element also being coupled to the first output terminal, wherein the first switching element, the second switching element, the third switching element and the fourth switching element have an identical voltage rating;
   the inverter includes an undervoltage-lockout protection circuit coupled to the second pair of switching elements; and
   a controller coupled to the second pair of switching elements and configured to control the third switching element and the fourth switching element to prevent occurrence of an overvoltage condition.

7. The UPS system of claim 6, wherein the system includes the second power source and the second power source includes a battery.

8. The UPS system of claim 6, wherein the overvoltage condition includes at least one of the following: the first switching element is on while the third switching element is off, the second switching element is on while the fourth switching element is off, the first and the third switching elements or the second and the fourth switching elements simultaneously change their states, an incorrect voltage across the third or the fourth switching elements, a junction capacitance of the third switching element is less than a junction capacitance of the first switching element, or a junction capacitance of the fourth switching element is less than a junction capacitance of the second switching element.

9. The UPS system of claim 6, wherein the undervoltage-lockout protection circuit includes an isolated power supply, a gate driver chip with undervoltage-lockout protection, a gate drive undervoltage monitoring unit and an optocoupler.

10. The UPS system of claim 6, wherein the inverter comprises a first resistor and a first diode connected between the first pair of switching elements, wherein the first resistor and the first diode are further connected to a second resistor and a second diode, wherein the second resistor and the second diode are connected between the second pair of switching elements.

11. An uninterruptible power system comprising:
a first input configured to connect to a first power source;
a second input configured to connect to a second power source;
an AC output configured to provide output power derived from at least one of power at the first input and power at the second input, the AC output having a first output terminal and a second output terminal;
power circuitry coupled to the first input, the second input, and the AC output, the power circuitry including an inverter having a first pair of switching elements including a first switching element and a second switching element, wherein the first switching element is coupled to a positive voltage rail and the second switching element is coupled to a negative voltage rail and a second pair of switching elements including a third switching element and a fourth switching element, wherein the third switching element is coupled to the first switching element and the fourth switching element is coupled to the second switching element, the third switching element and the fourth switching element also being coupled to the first output terminal, wherein the first switching element, the second switching element, the third switching element and the fourth switching element have an identical voltage rating;
a controller coupled to the second pair of switching elements and configured to control the third switching element and the fourth switching element to prevent occurrence of an overvoltage condition; and
a PWM controller logic for turning on at least one of the first pair of switching elements only if a PWM input for at least one of the second pair of switching elements is high.

12. The uninterruptible power system of claim 11, wherein the controller is configured to provide a plurality of pulse width modulated control signals to the inverter, and wherein the plurality of pulse width modulated control signals provided by the controller is configured to prevent occurrence of a plurality of overvoltage conditions, and wherein the plurality of overvoltage conditions includes at least one of the following: the first switching element is on while the third switching element is off, the second switching element is on while the fourth switching element is off, the first and the third switching elements or the second and the fourth switching elements simultaneously change their states, an incorrect voltage across the third or the fourth switching elements, a junction capacitance of the third switching element is less than a junction capacitance of the first switching element, or a junction capacitance of the fourth switching element is less than a junction capacitance of the second switching element.

13. The uninterruptible power system of claim 11, wherein the inverter includes an undervoltage-lockout protection circuit coupled to the second pair of switching elements.

14. The uninterruptible power system of claim 11, wherein the inverter comprises a first resistor and a first diode connected between the first pair of switching elements, wherein the first resistor and the first diode are further connected to a second resistor and a second diode, wherein the second resistor and the second diode are connected between the second pair of switching elements.

15. An uninterruptible power system comprising:
a first input configured to connect to a first power source;
a second input configured to connect to a second power source;
an AC output configured to provide output power derived from at least one of power at the first input and power at the second input, the AC output having a first output terminal and a second output terminal;
power circuitry coupled to the first input, the second input, and the AC output, the power circuitry including an inverter having a first pair of switching elements including a first switching element and a second switching element, wherein the first switching element is coupled to a positive voltage rail and the second switching element is coupled to a negative voltage rail and a second pair of switching elements including a third switching element and a fourth switching element, wherein the third switching element is coupled to the first switching element and the fourth switching element is coupled to the second switching element, the third switching element and the fourth switching element also being coupled to the first output terminal, wherein the first switching element, the second switching element, the third switching element and the fourth switching element have an identical voltage rating;
a controller coupled to the second pair of switching elements and configured to control the third switching element and the fourth switching element to prevent occurrence of an overvoltage condition; and
a delay scheme for delaying gating pulses for at least one of the first pair of switching elements at the rising edge and for delaying gating pulses for at least one of the second pair of switching elements at the falling edge.

16. The uninterruptible power system of claim 15, wherein the controller is configured to provide a plurality of pulse width modulated control signals to the inverter, and wherein the plurality of pulse width modulated control signals provided by the controller is configured to prevent occurrence of a plurality of overvoltage conditions, and wherein the plurality of overvoltage conditions includes at least one of the following: the first switching element is on while the third switching element is off, the second switching element is on while the fourth switching element is off, the first and the third switching elements or the second and the fourth switching elements simultaneously change their states, an incorrect voltage across the third or the fourth switching elements, a junction capacitance of the third switching element is less than a junction capacitance of the first switching element, or a junction capacitance of the fourth switching element is less than a junction capacitance of the second switching element.

17. The uninterruptible power system of claim 15, wherein the inverter includes an undervoltage-lockout protection circuit coupled to the second pair of switching elements.

18. The uninterruptible power system of claim 15, wherein the inverter comprises a first resistor and a first diode connected between the first pair of switching elements, wherein the first resistor and the first diode are further connected to a second resistor and a second diode, wherein the second resistor and the second diode are connected between the second pair of switching elements.

\* \* \* \* \*